(12) United States Patent
Miyoshi

(10) Patent No.: US 9,499,254 B2
(45) Date of Patent: Nov. 22, 2016

(54) TRIM ADJUSTMENT DEVICE, AIRCRAFT, AND METHOD OF PERFORMING TRIM ADJUSTMENT

(71) Applicant: MITSUBISHI AIRCRAFT CORPORATION, Aichi (JP)

(72) Inventor: Masaya Miyoshi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 391 days.

(21) Appl. No.: 14/186,281

(22) Filed: Feb. 21, 2014

(65) Prior Publication Data
US 2016/0185446 A1    Jun. 30, 2016

(30) Foreign Application Priority Data

Mar. 26, 2013  (JP) .................................. 2013-64429

(51) Int. Cl.
*B64C 13/08*    (2006.01)
*B64D 45/00*    (2006.01)

(52) U.S. Cl.
CPC ........... *B64C 13/08* (2013.01); *B64D 45/0005* (2013.01)

(58) Field of Classification Search
CPC ... B64C 13/08; B64C 15/12; G06F 17/5095; B64D 45/0015; B64D 45/0005
USPC .................................... 701/3; 703/8; 244/56
See application file for complete search history.

(56) References Cited

U.S. PATENT DOCUMENTS

| 2005/0065667 A1* | 3/2005 | Weineck ............ B64D 45/0015 701/3 |
| 2010/0019081 A1* | 1/2010 | Cazals .................... B64C 15/12 244/56 |
| 2010/0318336 A1* | 12/2010 | Falangas ............. G06F 17/5095 703/8 |

FOREIGN PATENT DOCUMENTS

JP    06-321190 A    11/1994

* cited by examiner

*Primary Examiner* — Yuri Kan
(74) *Attorney, Agent, or Firm* — Pearne & Gordon LLP

(57) ABSTRACT

Trim adjustment devices 20, 30, 40 at least include trim control switches 21, 31, 41 for performing a trim adjustment; acquisition sections 22, 32, 42 for acquiring a designated value for a position designated through the operation of the switches 21, 31, 41; and converting sections 23, 33, 43 for converting the designated value to a converted designated value expressed in different units. The switches 21, 31, 41 operate at a changeable rate in which the designated value changes at a prescribed amount of change per unit time, the prescribed amount of change expressed in units of the designated value before the conversion. The sections 23, 33, 43 converts the designated value to the converted designated value expressed in minimum units (0.1 UNIT) based on the product of the changeable rate and a click time period required for clicking the switches 21, 31, 41 once.

10 Claims, 3 Drawing Sheets

TRIM ADJUSTMENT DEVICE, AIRCRAFT, AND METHOD OF PERFORMING TRIM ADJUSTMENT

BACKGROUND OF THE INVENTION

Field of the Invention

The present invention relates to a trim adjustment device mounted on an aircraft.

Description of the Related Art

An aircraft includes a trim adjustment device for setting a neutral position of a control surface controlling section before take-off or during flight according to the weight, the center of gravity, and distortion of the airframe (see, for example, Japanese Patent Laid-Open No. 6-321190.). Performing trim adjustments reduces the burden on a pilot who steers a control wheel, a control stick, and/or a control pedal of an aircraft that serve as control surface controlling sections.

Such a trim adjustment device includes a trim control switch provided on a control stick or a control panel, and in response to the operation of the trim control switch, the trim adjustment device outputs a designated value indicating a neutral position of a control surface controlling section. The designated value is displayed on a monitor screen in a pilot compartment as an angle of a control surface or a relative ratio in a trim control range. A pilot operates the trim control switch to increase or decrease the designated value, thereby adjusting the designated value to an appropriate value.

The trim control switch operates such that, while it is pressed, the designated value changes at a prescribed amount of change per unit time (a changeable rate). When a pilot performs a trim adjustment, the operator continuously presses the trim control switch to have the designated value reach the vicinity of a desired value, and then repeatedly presses it several times to adjust the designated value to the desired value.

It is assumed that the changeable rate of the trim control switch is 3.0 degrees per second, for example. In this case, when the trim control switch is pressed only for ¼ second, the value advances 0.75 degree. Thus, when the designated value is displayed on a monitor screen with a resolution of 0.1 degree, it is difficult to advance the value only by 0.1 degree from 6.0 degrees to 6.1 degrees. In other words, it is difficult to press the trim control switch for a time period corresponding to 0.1 degree. Thus, the trim adjustment involves advancing the designated value to exceed the desired value 6.1 and then excessively returning, which renders the operation more difficult and time consuming.

Thus, the object of the present invention is to improve the workability of trim adjustments.

SUMMARY OF THE INVENTION

In considering the improvement of the workability of trim adjustments, the inventor has considered in what units a designated value, which expresses a neutral position, should be expressed. In the prior art, a designated value is expressed as an angle or a relative ratio in a trim control range. In this case, the designated value is expressed as a positive (+) or negative (−) value with reference to a standard neutral position.

However, when being expressed as a positive or negative value, the designated value can be erroneously read with its positive or negative sign being reversely read.

It has also been proposed that a designated value is converted to a converted designated value expressed in different units such that the converted designated value is expressed as a positive value or zero. The use of the different unit (UNIT) prevents reading errors regarding whether the value is positive or negative.

However, the conversion to a value in UNITs is performed with the use of a conversion rate in which a certain amount of change in the designated value is converted to a one UNIT change in the converted designated value. In this case, depending on the selected conversion rate, similarly to the above, it will become difficult to advance the designated value by an amount of a resolution of a display (e.g. by 0.1 UNIT), which renders trim adjustments difficult and time consuming.

In view of the above, the inventor has pursued the ideal conversion rate to UNITs and conceived of using an amount of change when a trim control switch is clicked once as a minimum unit.

A trim adjustment device of the present invention includes: a trim control section for being operated to perform a trim adjustment for setting a neutral position of a control surface controlling section for controlling a control surface or a current position of the control surface; a designated value acquisition section for acquiring a designated value for a position designated through the operation of the trim control section; a converting section for performing a unit conversion of the designated value to a converted designated value expressed in different units; and a display section for displaying the converted designated value provided by the converting section. The trim control section operates at a changeable rate in which the designated value changes at a prescribed amount of change per unit time, the prescribed amount of change being expressed in units of the designated value before the unit conversion.

The present invention provides such a trim adjustment device wherein the converting section performs the unit conversion of the designated value to the converted designated value expressed in minimum units, the minimum unit being based on the product of the changeable rate and a click time period required when the trim control section is clicked once.

The minimum unit of the present invention is determined as 0.1 UNIT, which is obtained by multiplying one UNIT by a factor of 0.1.

The click time required when the trim control section is clicked once is determined based on the test results of measuring the short time period required for a test subject to press the trim control section once and then release it (click once).

In the present invention, the designated value is converted to the converted designated value expressed in minimum units, and the minimum unit is based on an amount of change for the click time period required when the trim control section is clicked once (i.e. the product of the changeable rate and the click time period).

Accordingly, when the trim control section is clicked once, the converted designated value displayed on the display section changes by one minimum unit. When the trim control section is continuously pressed, the converted designated value repeatedly changes by the minimum unit. Thus, while the display section is being viewed, the designated value is easily adjusted to a desired value, whereby the workability of trim adjustments can be improved.

The minimum unit preferably constitutes a scale on which the designated value is expressed as a positive value, not as a negative value. This prevents operational errors caused by erroneous reading of the designated value with its positive or negative sign being reversely read.

Preferably, the trim adjustment device of the present invention includes a rounding section for rounding the converted designated value provided by the converting section in such a manner that fractions of the converted designated value less than the minimum unit are rounded, and the display section displays the converted designated value which is rounded by the rounding section.

In this case, when the minimum unit is 0.1 UNIT, for example, the designated value is displayed on the display section with the same resolution of 0.1 UNIT. Thus, since the designated value changes in steps of the resolution of the display section, the operation is facilitated.

The rounding section of the present invention may round the designated value using any rounding method.

In cases where the rounding-down method is used, assuming that an operator continuously presses the trim control section until the designated value reaches a little before the lower limit of the trim control range, in order to adjust the designated value to the minimum scale on the display, that is, to the scale of one minimum unit (e.g. 0.1 UNIT), all the designated value that is moved to less than the one minimum unit is rounded to zero, which renders the adjustment operation difficult.

When the rounding-up method is used, it may occur that the designated value exceeds the upper limit of the trim control range.

When the rounding-off method is used, an operator can easily adjust the designated value even to the minimum scale without exceeding the limits of a trim control range.

The present invention provides an aircraft wherein the aircraft includes a steering member having a control surface; and the trim adjustment device described above.

According to the present invention, the trim adjustment device serves the same effects as described above.

The present invention provides a method of performing a trim adjustment in which a neutral position of a control surface controlling section for controlling a control surface or a current position of the control surface are set, wherein the method includes: performing a unit conversion of a designated value for a position for the trim adjustment to a converted designated value, wherein the designated value for the position for the trim adjustment is designated through the operation of a trim control section, wherein the trim control section operates at a changeable rate in which the designated value changes at a prescribed amount of change per unit time, and wherein the converted designated value is expressed in minimum units, the minimum unit being based on the product of the changeable rate and a click time period required when the trim control section is clicked once; and displaying the converted designated value.

According to the present invention, the method serves the same effects as the trim adjustment device described above.

The present invention can improve the workability of trim adjustments.

DETAILED DESCRIPTION OF THE PREFERRED EMBODIMENTS

The present invention will be described in detail below with reference to the embodiment shown in the accompanying drawings.

[General Configuration]

Figure 1:
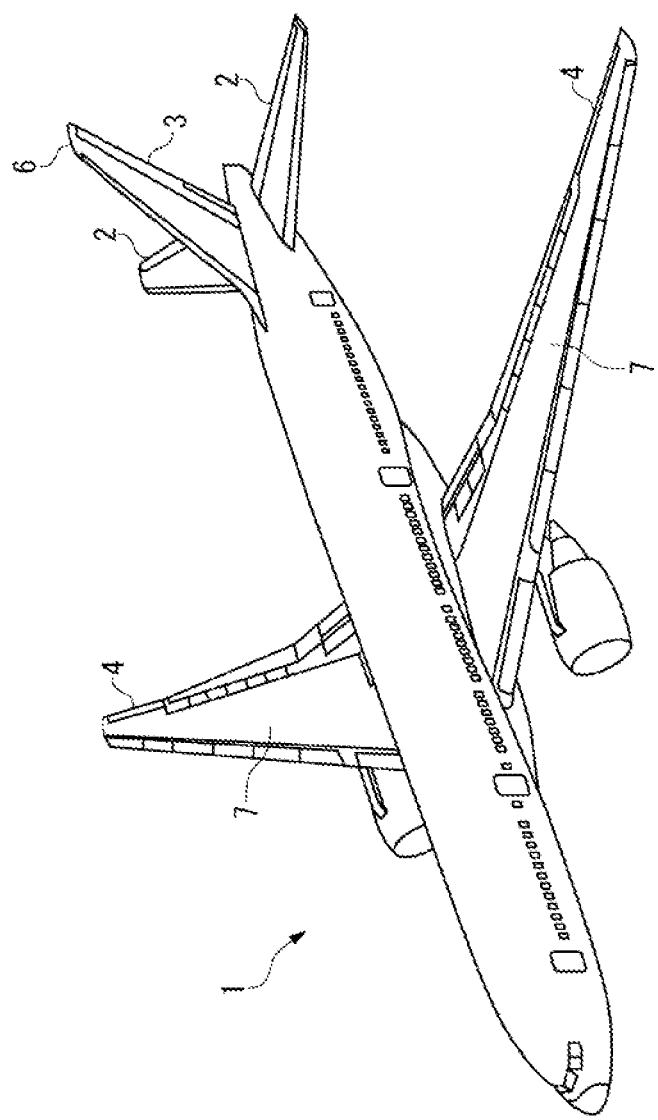
FIG. 1 is a diagram showing an aircraft in accordance with an embodiment of the present invention.

An aircraft 1 shown in FIG. 1 includes steering members including stabilizers 2, a rudder 3, and ailerons 4 with respective control surfaces to be subject to trim adjustments. The aircraft 1 further includes a control pedal 13 and a control wheel 12 shown in FIG. 2, which respectively serve as control surface controlling sections for the control surfaces of the rudder 3 and the ailerons 4, respectively. The aircraft 1 also includes trim adjustment devices 20, 30, 40 and a control device 50 for controlling the operation of the entire aircraft 1.

[Steering Members]

The stabilizer 2 is also known as a horizontal stabilizer (horizontal tail plane), and is configured such that the entire horizontal stabilizer can move up and down. The stabilizers 2 can be pivoted by the operation of a trim control switch 21 provided on the control wheel 12.

The rudder (vertical rudder) 3 is provided at the rear of a vertical tail fin 6. When a pilot steps on the control pedal 13, the rudder 3 is pivoted to cause a yawing of the aircraft body about the vertical axis passing through the center of gravity. When a pilot steps on a left part of the control pedal 13, the aircraft body turns to the left. When a pilot steps on a right part of the control pedal 13, the aircraft body turns to the right.

The ailerons 4 are provided at the trailing edges of the main wings 7. When a pilot turns the control wheel 12, the ailerons 4 are pivoted about the transverse axis of the aircraft body to have the aircraft body bank (roll) about the longitudinal axis thereof. When a pilot turns the control wheel 12 to the left, the aircraft body banks to the left. When a pilot turns the control wheel 12 to the right, the aircraft body banks to the right.

The stabilizers 2, the rudder 3, and the ailerons 4 are driven by the respective actuators (not shown).

[Trim Adjustments]

Figure 2:
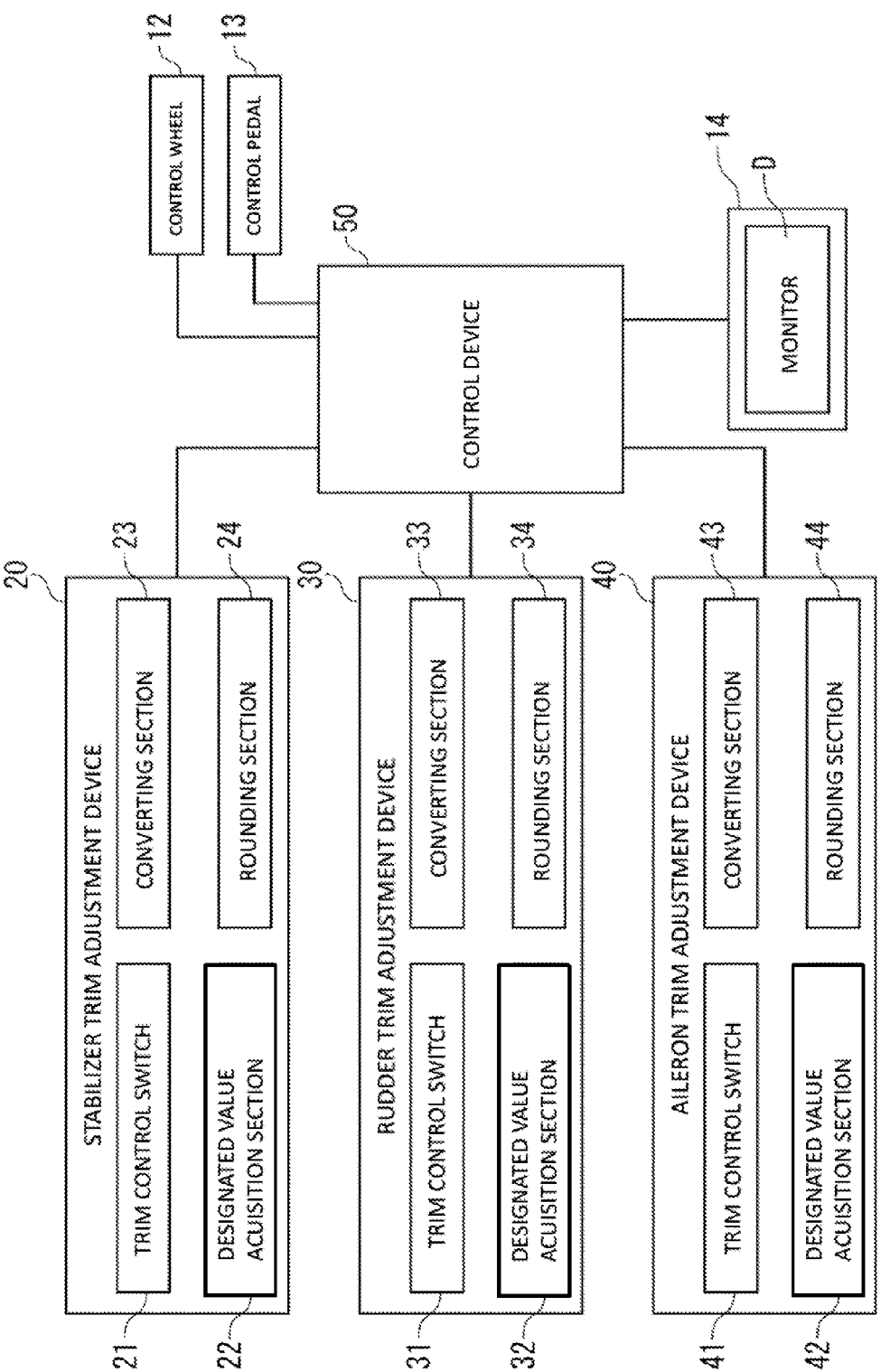
FIG. 2 is a block diagram showing a trim adjustment device and a control device.

As shown in FIG. 2, the aircraft 1 includes a stabilizer trim adjustment device 20 for trim adjustments of the stabilizers 2, a rudder trim adjustment device 30 for trim adjustments of the rudder 3, and a aileron trim adjustment device 40 for trim adjustments of the ailerons 4, these devices being mounted on the aircraft.

The trim adjustment devices 20, 30, 40 are respectively operated by a pilot before take-off and during fight.

The stabilizer trim adjustment device 20 provides the control device 50 with a designated value indicative of a current position of the control surface of the stabilizers 2.

The rudder trim adjustment device 30 provides the control device 50 with a designated value indicative of a neutral position of the control pedal 13 that serves as a control surface controlling section for the rudder 3. Also, the aileron trim adjustment device 40 provides the control device 50 with a designated value indicative of a neutral position of the control wheel 12 that serves as a control surface controlling section for the ailerons 4.

[Control Device]

The control device 50 independently drives the corresponding actuators provided for the stabilizers 2, the rudder 3, and the ailerons 4 based on the respective designated values supplied by the trim adjustment devices 20, 30, 40.

Figure 3:
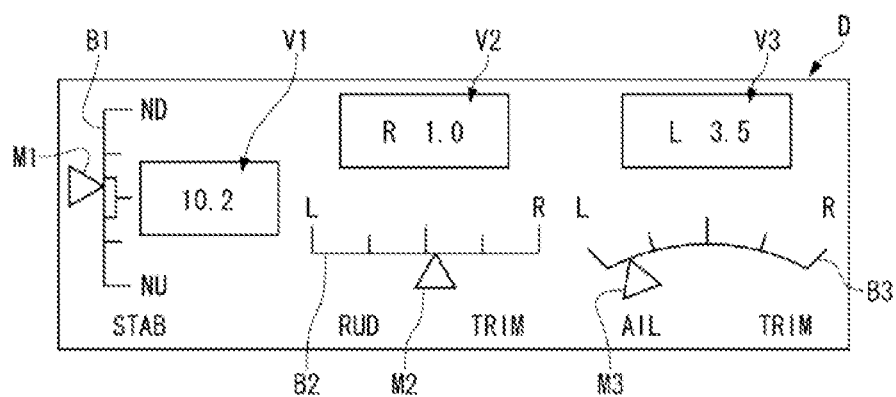
FIG. 3 is a schematic diagram showing a monitor screen on which a designated value is displayed.

Also, as shown in FIG. 3, the control device 50 displays the designated values V1, V2, V3 on a screen D of a monitor 14 provided in a pilot compartment where the designated values V1, V2, V3 are supplied by the trim adjustment devices 20, 30, 40, respectively, as a converted value expressed in units of UNITs.

The screen D displays a bar B1 indicative of a trim adjustment range for the stabilizers 2, and a pointer M1 indicative of a current position of the control surface of the stabilizers 2 indicated on the bar B1.

The screen D also displays bars B2, B3 indicative of respective trim adjustment ranges for the rudder 3 and the ailerons 4, and pointers M2, M3 indicative of respective neutral positions of the rudder 3 and the ailerons 4 indicated on the bars B2, B3.

[Respective Trim Adjustment Devices for Stabilizers, Rudder, and Ailerons]

The stabilizer trim adjustment device 20 sets a current position of the control surface of the stabilizers 2 within the trim adjustment range for the stabilizers 2. The stabilizer trim adjustment device 20 includes a trim control switch 21 (trim control section) for being operated to perform trim adjustments, a designated value acquisition section 22 for acquiring a designated value for a current position designated through the operation of the trim control switch 21, a converting section 23 for performing a unit conversion of the designated value to a converted designated value expressed in units of UNITs, and a rounding section 24 for rounding the converted designated value.

The rudder trim adjustment device 30 sets a neutral position of the control pedal 13 within the trim adjustment range for the rudder 3. The rudder trim adjustment device 30 includes a trim control switch 31 for being operated to perform trim adjustments, a designated value acquisition section 32 for acquiring a designated value for a neutral position designated through the operation of the trim control switch 31, a converting section 33 for performing a unit conversion of the designated value to a converted designated value expressed in units of UNITs, and a rounding section 34 for rounding the converted designated value.

The aileron trim adjustment device 40 sets a neutral position of the control wheel 12 within the trim adjustment range for the ailerons 4. The aileron trim adjustment device 40 includes a trim control switch 41 for being operated to perform trim adjustments, a designated value acquisition section 42 for acquiring a designated value for a neutral position designated through the operation of the trim control switch 41, a converting section 43 for performing a unit conversion of the designated value to a converted designated value expressed in units of UNITs, and a rounding section 44 for rounding the converted designated value.

The designated value acquisition sections 22, 32, 42, the converting sections 23, 33, 43, and the rounding sections 24, 34, 44 may be integrally incorporated into the control device 50.

[Changeable Rate and Trim Adjustment Ranges]

The trim control switches 21, 31, 41 operate at respective predetermined changeable rate Rt1, Rt2, Rt3.

A changeable rate is a rate at which the designated value changes per unit time when the trim control switches 21, 31, 41 are operated, and is expressed in units of the designated value before it is converted by the converting sections 23, 33, 43 to a converted value expressed by the UNIT.

The designated value for a current position of the control surface of the stabilizers 2 is designated by the angle (in degrees). The trim adjustment range for the stabilizers 2 is set to a predetermined range including a standard position at which no trim adjustment is made, with negative values for the nose-up side shift from the standard position, and positive values for the nose-down side shift from the standard position.

The designated value for a neutral position of the control pedal 13 for controlling the rudder 3 is designated by the amount of pedaling (in inches) with which the pilot steps on the control pedal 13. The trim adjustment range for the rudder 3 is set to a predetermined range including a standard neutral position at which no trim adjustment is made, with positive values for the left side shift from the standard neutral position, and negative values for the right side shift from the standard neutral position.

The designated value for a neutral position of the control wheel 12 for controlling the ailerons 4 is designated by the steering angle (in degrees) of the control wheel 12. The trim adjustment range for the ailerons 4 is set to a predetermined range including a standard neutral position, with positive values for the left side shift from the standard neutral position, and negative values for the right side shift from the standard neutral position.

[Trim Control Switches]

The trim control switches 21, 31, 41 are provided within a cockpit.

When each trim control switch 21, 31, 41 is pressed with a finger in a positive or negative direction, a designated value for a corresponding neutral position increases or decreases.

While the trim control switch 21 for the stabilizers 2 is pressed, the designated value changes at the changeable rate Rt1.

While the trim control switch 31 for the rudder 3 is pressed, the designated value changes at the changeable rate Rt2.

While the trim control switch 41 for the ailerons 4 is pressed, the designated value changes at the changeable rate Rt3.

[Designated Value Acquisition Sections]

The designated value acquisition section 22 for the stabilizers 2 acquires a designated value that has changed through the operation of the trim control switch 21, and outputs the acquired designated value (in units of degrees) to the control device 50.

The designated value acquisition section 32 for the rudder 3 acquires a designated value that has changed through the operation of the trim control switch 31, and outputs the acquired designated value (in units of inches) to the control device 50.

The designated value acquisition section 42 for the ailerons 4 acquires a designated value that has changed through the operation of the trim control switch 41, and outputs the acquired designated value (in units of degrees) to the control device 50.

The respective designated values provided by the designated value acquisition sections 22, 32, 42 are used to drive the actuators provided for the stabilizers 2, rudder 3, and ailerons 4, respectively.

[Converting Sections]

The converting section 23 for the stabilizers 2 performs a unit conversion of the designated value (in units of degrees) acquired by the designated value acquisition section 22 to a converted designated value expressed in units of UNITs.

The converting section 33 for the rudder 3 performs a unit conversion of the designated value (in units of degrees) acquired by the designated value acquisition section 32 to a converted designated value expressed in units of UNITs.

The converting section 43 for the ailerons 4 performs a unit conversion of the designated value (in units of degrees) acquired by the designated value acquisition section 42 to a converted designated value expressed in units of UNITs.

[Rounding Sections]

The rounding section 24 for the stabilizers 2 rounds the converted designated value provided by the converting section 23, and outputs the rounded designated value to the control device 50.

The rounding section 34 for the rudder 3 rounds the converted designated value provided by the converting section 33, and outputs the rounded designated value to the control device 50.

The rounding section 44 for the ailerons 4 rounds the converted designated value provided by the converting section 43, and outputs the rounded designated value to the control device 50.

All the above described rounding sections 24, 34, 44 adopt the rounding method in which fractions of the converted designated value are rounded off.

[Units of UNITs]

UNIT, the unit by which the converted designated value is expressed, is defined such that, in the trim adjustment devices 20, 30, 40 with their respective specific changeable rates, the angle of the control surface, the amount of pedaling with which the pilot steps on the control pedal 13, and the steering angle of the control wheel 12 each change in minimum units where each minimum unit corresponds to the click time period required when the trim control switch 21, 31, or 41 is clicked once, and is determined as 0.1 UNIT.

The UNIT constitutes a scale which begins at zero and has positive values.

The minimum unit is obtained by multiplying 1 UNIT by a factor of 0.1.

The above described rounding sections 24, 34, 44 round the converted designated value in such a manner that fractions of the converted designated value less than the minimum unit of 0.1 UNIT are rounded. The factor of 0.1 is equivalent to a resolution (0.1 UNIT) with which the designated value is displayed on the screen D for visualization.

[Click Time Period]

A click time period required when a trim control switch is clicked once is determined based, for example, on the following test:

That is, a test subject clicks a trim control switch once to record a time period from when his finger touches on the switch to when it leaves the switch. The test subject is required to conduct this one click operation not in a particularly quick manner, but in a natural manner. The click operation tests are conducted on the same subject more than once and the recorded data are averaged. Such tests are conducted on two or more test subjects who have different physical sizes.

If the results of such tests provide an average one-click time period of about 0.2 second, the click time period Tm can be determined to be 0.2 second.

In the present embodiment, all the trim control switches 21, 31, 41 have the same structure. Thus, for each trim control switch 21, 31, 41, a common click time period Tm is used as a click time period required when the trim control switch is clicked once.

However, depending on the structures of the trim control switches 21, 31, 41, different click time periods may be set for the respective trim control switches 21, 31, 41.

In addition to the above-described test method, the click time period Tm can be determined based on empirical values.

[Conversion to Values Expressed in UNITs]

The method of converting the designated value for trim adjustments of the stabilizers 2, the method of converting the designated value for trim adjustments of the rudder 3, and the method of converting the designated value for trim adjustment of the ailerons 4 will be described below.

Rounding operation of the converted designated values will also be described.

[Unit Conversion for the Stabilizers]

The converting section 23 performs a unit conversion of a designated value specified by the angle to a converted designated value in units of UNITs such that the converted designated value is expressed in minimum units where the minimum unit, which is determined as 0.1 UNIT, is the product P1 of the click time period Tm for the trim control switch 21 and the changeable rate Rt1, that is, an amount of change for the click time period Tm. In other words, the conversion rate for the stabilizers 2 is such that a UNIT of the designated value is converted to an amount of (P1×10).

Then, the rounding section 24 rounds the converted designated value to a rounded designated value with the number of decimal digits that is equivalent to a resolution of the screen D on which the designated value is displayed (i.e. a decimal value with one decimal place). The rounded designated value is displayed on the screen D (FIG. 3) as the designated value V1. With the update of the designated value V1, the position of the pointer M1 on the bar B1 is also updated.

[Unit Conversion for the Rudder]

The converting section 33 performs a unit conversion of a designated value specified by the amount of pedaling (in inches) with which the pilot steps on the control pedal 13 to a converted designated value in units of UNITs such that the converted designated value is expressed in minimum units where the minimum unit, which is determined as 0.1 UNIT, is the product P2 of the click time period Tm for the trim control switch 31 and the changeable rate Rt2, that is, an amount of change for the click time period Tm. In other words, the conversion rate for the rudder 3 is such that a UNIT of the designated value is converted to an amount of (P2×10) inches.

Then, after the rounding section 34 rounds the converted designated value to a rounded designated value with one decimal place, the rounded designated value is displayed on the screen D (FIG. 3) as the designated value V2. With the update of the designated value V2, the position of the pointer M2 on the bar B2 is also updated.

[Unit Conversion for the Ailerons]

The converting section 43 performs a unit conversion of a designated value specified by the steering angle (in degrees) of the control wheel 12 to a converted designated value in units of UNITs such that the converted designated value is expressed in minimum units where the minimum unit, which is determined as 0.1 UNIT, is the product P3 of the click time period Tm for the trim control switch 41 and the changeable rate Rt3, that is, an amount of change for the click time period Tm. In other words, the conversion rate for the ailerons 4 is such that a UNIT of the designated value is converted to an amount of (P3×10) degrees.

Then, after the rounding section 44 rounds the converted designated value to a rounded designated value with one decimal place, the rounded designated value is displayed on the screen D (FIG. 3) as the designated value V3. With the update of the designated value V3, the position of the pointer M3 on the bar B3 is also updated.

For the stabilizers 2, a designated value in UNITs is expressed as a positive value with a standard position (0 UNIT) at one end of the trim adjustment range.

For the rudder 3, a designated value in UNITs is expressed as a positive value such that the designated value increases in both left and right directions from a standard neutral position. As shown in the drawing including the designated value V2 displayed on the screen D, the letters L and R which mean Left and Right, respectively, are used to indicate the two directions.

For the ailerons 4, a designated value in UNITs is also expressed as a positive value such that the designated value increases in both left and right directions from a standard neutral position. As shown in the drawing including the designated value V3 displayed on the screen D, the letters L and R which mean Left and Right, respectively, are used to indicate the two directions.

[Operation and Effect of the Present Embodiment]

In the present embodiment, an amount of change in a designated value for the click time period Tm, which is an operate time period required when the trim control switch 21, 31, or 41 is clicked once, is converted to a converted designated value expressed in minimum units, and displayed on the screen D of the monitor 14.

A pilot specifies a designated value expressed in UNITs for a possible trim adjustment as appropriate according to the weight, the center of gravity, and distortion of an airframe before take-off or during flight. That is, the pilot operates the trim control switches 21, 31, and 41 to provide instructions to the trim adjustment devices 20, 30, and 40. More specifically, when the trim control switch 21, 31, or 41 is clicked once, the designated value V1, V2, or V3 in the screen D changes by one minimum unit (0.1 UNIT). When the trim control switch 21, 31, or 41 is continuously pressed, the designated value repeatedly changes by the minimum unit.

For example, when the designated value displayed on the screen D is 7.1 UNITs, the adjustment of the designated value to a desired value of 7.3 UNITs requires clicking twice. The adjustment of the value from 7.1 to a desired value of 15.4 only requires continuously pressing the switch, and then clicking it as many time as is necessary.

The minimum unit used in the unit conversion according to the present embodiment is based on an amount of change for a time period required for a one-click operation which an operator can conduct in a natural manner. Thus, an operator (pilot) can effectively perform an adjustment of the designated value displayed on the screen D without causing the desired value to advance in excess of the operator's expected value, through intuitive operations of the trim control switch 21, 31, or 41 including clicking the switch as many times as is necessary, and continuously pressing the switch.

Other than these, the configurations cited in the above described embodiment can be selected or omitted, or can be changed to other configurations as appropriate, without departing from the spirit of the present invention.

The present invention is applicable to trim adjustments for any types of steering members as well as stabilizers, rudders, and ailerons as exemplified in the above described embodiment. For example, the present invention is applicable to trim adjustments to elevators (flippers).

What is claimed is:

1. A trim adjustment device comprising:
a trim control switch for being operated to perform a trim adjustment for setting a neutral position of a control surface controlling section for controlling a control surface or a current position of the control surface;
a designated value acquisition section for acquiring a designated value for a position designated through the operation of the trim control switch;
a converting section for performing a unit conversion of the designated value to a converted designated value expressed in different units; and
a display for displaying the converted designated value provided by the converting section;
wherein the trim control switch operates at a changeable rate in which the designated value changes at a prescribed amount of change per unit time, the prescribed amount of change being expressed in units of the designated value before the unit conversion; and
wherein the converting section performs the unit conversion of the designated value to the converted designated value expressed in minimum units, the minimum units being based on the product of the changeable rate and a click time period required when the trim control switch is clicked once.

2. The trim adjustment device according to claim 1, further comprising a rounding section for rounding the converted designated value provided by the converting section in such a manner that fractions of the converted designated value less than the minimum units are rounded, and
wherein the display displays the converted designated value which is rounded by the rounding section.

3. The trim adjustment device according to claim 2, wherein the rounding section rounds off the converted designated value.

4. An aircraft comprising:
a steering member having a control surface; and
the trim adjustment device according to claim 1.

5. An aircraft comprising:
a steering member having a control surface; and
the trim adjustment device according to claim 2.

6. An aircraft comprising:
a steering member having a control surface; and
the trim adjustment device according to claim 3.

7. A method of performing the trim adjustment according to claim 1 in which a neutral position of a control surface controlling section for controlling a control surface or a current position of the control surface are set, the method comprising:
performing a unit conversion of a designated value for a position for the trim adjustment to a converted designated value, wherein the designated value for the position for the trim adjustment is designated through the operation of a trim control switch, wherein the trim control switch operates at a changeable rate in which the designated value changes at a prescribed amount of change per unit time, and wherein the converted designated value is expressed in minimum units, the minimum units being based on the product of the changeable rate and a click time period required when the trim control switch is clicked once; and
displaying the converted designated value.

8. A trim adjustment method comprising:
performing a trim adjustment for setting a neutral position for controlling a control surface or a current position of the control surface;
acquiring a designated value for a position designated through performing the trim adjustment;
performing a unit conversion of the designated value to a converted designated value expressed in different units; and
displaying the converted designated value,
wherein performing the trim adjustment occurs at a changeable rate in which the designated value changes at a prescribed amount of change per unit time, the prescribed amount of change being expressed in units of the designated value before the unit conversion; and wherein performing the unit conversion comprises performing the unit conversion of the designated value to the converted designated value expressed in minimum units, the minimum units being based on the product of the changeable rate and a click time period required when a trim control switch is clicked once.

9. The trim adjustment method according to claim 8, further comprising:
rounding the converted designated value in such a manner that fractions of the converted designated value less than the minimum units are rounded, and
displaying the converted designated values comprises displaying the converted designated value which is rounded.

10. The trim adjustment method according to claim 9, wherein rounding rounds off the converted designated value.

* * * * *